(12) United States Patent
Neate et al.

(10) Patent No.: US 8,164,264 B2
(45) Date of Patent: Apr. 24, 2012

(54) LAMP

(75) Inventors: Andrew Simon Neate, Buckinghamshire (GB); Amjid Sadiq, Buckinghamshire (GB)

(73) Assignee: Ceravision Limited, Milton Keynes (GB)

( * ) Notice: Subject to any disclaimer, the term of this patent is extended or adjusted under 35 U.S.C. 154(b) by 450 days.

(21) Appl. No.: 12/227,752

(22) PCT Filed: May 24, 2007

(86) PCT No.: PCT/GB2007/001935
§ 371 (c)(1),
(2), (4) Date: Apr. 7, 2009

(87) PCT Pub. No.: WO2007/138276
PCT Pub. Date: Dec. 6, 2007

(65) Prior Publication Data
US 2009/0315461 A1    Dec. 24, 2009

(30) Foreign Application Priority Data

May 30, 2006  (GB) .................................. 0610580.3

(51) Int. Cl.
*H01J 7/46* (2006.01)
(52) U.S. Cl. ... 315/39; 315/39.3; 315/39.51; 315/39.55; 315/41; 315/44
(58) Field of Classification Search .................. 315/39, 315/206, 202, 248, 551, 39.3, 39.51, 39.55, 315/41, 44
See application file for complete search history.

(56) References Cited

U.S. PATENT DOCUMENTS

| | | | | | |
|---|---|---|---|---|---|
| 4,431,977 | A | * | 2/1984 | Sokola et al. | 333/206 |
| 4,607,242 | A | * | 8/1986 | Cozzie | 333/209 |
| 4,746,883 | A | * | 5/1988 | Sauvage et al. | 333/202 |
| 5,786,667 | A | * | 7/1998 | Simpson et al. | 315/39 |
| 6,031,333 | A | * | 2/2000 | Simpson | 315/39 |
| 6,617,806 | B2 | * | 9/2003 | Kirkpatrick et al. | 315/248 |
| 6,737,809 | B2 | * | 5/2004 | Espiau et al. | 315/39 |
| 6,949,887 | B2 | * | 9/2005 | Kirkpatrick et al. | 315/248 |
| 7,042,314 | B2 | * | 5/2006 | Wang et al. | 333/202 |
| 2002/0011802 | A1 | | 1/2002 | Espiau et al. | |
| 2006/0002132 | A1 | * | 1/2006 | Lee et al. | 362/551 |

FOREIGN PATENT DOCUMENTS

| | | |
|---|---|---|
| EP | 1564788 | 8/2005 |
| EP | 1612842 | 1/2006 |
| WO | WO 95/12222 | 5/1995 |

* cited by examiner

*Primary Examiner* — Douglas W Owens
*Assistant Examiner* — Thai Pham
(74) *Attorney, Agent, or Firm* — Bay State IP, LLC; Adam J. Bruno

(57) ABSTRACT

A bandpass filter comprises an air filled aluminum chamber having a lid and a cuboid resonant cavity having a central iris. At opposite end nodes of the cavity, perfect electric conductors (PECs) are provided. Threaded tuning projections opposite the PECs and in the iris are provided, whereby the pass band and the transmission characteristics of the filter in the pass band can be tuned to match the input impedance of the band pass filter and the wave guide to the output impedance of a microwave drive circuit. It is mounted on one end of the filter chamber, with an electrodeless bulb in a central cavity directed axially away from the chamber and the radiator in a further cavity set to one side of the central cavity. When the filter is driven, the wave guide resonates driving the bulb.

11 Claims, 4 Drawing Sheets

LAMP

CROSS REFERENCE TO RELATED APPLICATIONS

This application is the U.S. National Stage of International Application Number PCT/GB2007/001935 filed on May 24, 2007 which was published in English on Dec. 6, 2007 under International Publication Number WO 2007/138276.

TECHNICAL FIELD

The present invention relates to a lamp to be driven from a source of microwave energy and having an electrodeless discharge bulb.

BACKGROUND OF THE INVENTION

Efficient coupling of microwave energy into the bulb is crucial to strongly exciting the contents of the bulb, to cause it to incandesce. For this reason, air wave guides have not been successful for this purpose.

In U.S. Pat. No. 6,737,809, in the name of F M Espiau et al., there is described:

A dielectric waveguide integrated plasma lamp with a body consisting essentially of at least one dielectric material having a dielectric constant greater than approximately 2, and having a shape and dimensions such that the body resonates in at least one resonant mode when microwave energy of an appropriate frequency is coupled into the body. A bulb positioned in a cavity within the body contains a gas-fill which when receiving energy from the resonating body forms a light-emitting plasma. (Despite reference to a "bulb", this specification does not describe a discrete bulb, separable from the lamp body.)

SUMMARY OF THE INVENTION

The object of the present invention is to provide improved coupling of microwave energy to an electrodeless bulb in a lamp.

According to the invention there is provided a lamp to be driven from a source of microwave energy, the lamp comprising:
  an electrodeless, discharge bulb,
  a radiator for radiating microwave energy to the bulb,
  a bulb receptacle formed of ceramic material coated with an electrically conductive shield, the receptacle having:
    a first recess containing the bulb, the recess being open to allow light to shine from the bulb and
    a second recess containing the radiator, with the second recess being open to allow connection of microwaves to the radiator and
  a microwave circuit having:
    an input for microwave energy from the source thereof and
    an output connection thereof to the radiator in the ceramic receptacle, wherein the microwave coupler is
  a capacitative-inductive circuit matching output impedance of the source of microwave energy to input impedance of the coupler, receptacle and bulb combination.

The microwave circuit, namely, the capacitative-inductive matching circuit can be a lumped element or tank circuit, preferably having discrete capacitor and inductor elements configured as a bandpass filter. Alternatively, it can be a comb line filter.

Whilst the preferred embodiment below the matching circuit is an air wave guide bandpass filter, it is specifically envisaged that a wave guide based on other dielectric materials may be used, for instance ceramic material. Such wave guide is described in U.S. Pat. No. 4,607,242.

Conveniently the circuit is arranged to be tunable, not only to take account of small production variations between the bulbs and the filters themselves, but also to give the filter bandwidth to include the resonant frequency of the wave guide and bulb.

In the preferred embodiment, the circuit comprises a pair of perfect electric conductors (PECs), each grounded inside a housing and each having a connection one for input and the other for output. Opposite the distal end of each PEC a tuning element is provided and a further tuning element is provided in the iris between the PECs.

Further, in the preferred embodiment, the bulb receptacle can be a resonant wave guide. Conveniently it is a half wave, wave guide or a quarter wave, wave guide in the interests of space saving. However, other configurations such as a full wave, wave guide can be envisaged.

Preferably it is of a material having a dielectric constant greater than one. Conveniently, it will be of ceramic material.

BRIEF DESCRIPTION OF THE DRAWINGS

To help understanding of the invention, a specific embodiment thereof will now be described by way of example and with reference to the accompanying drawings, in which.

DETAILED DESCRIPTION

Figure 1:
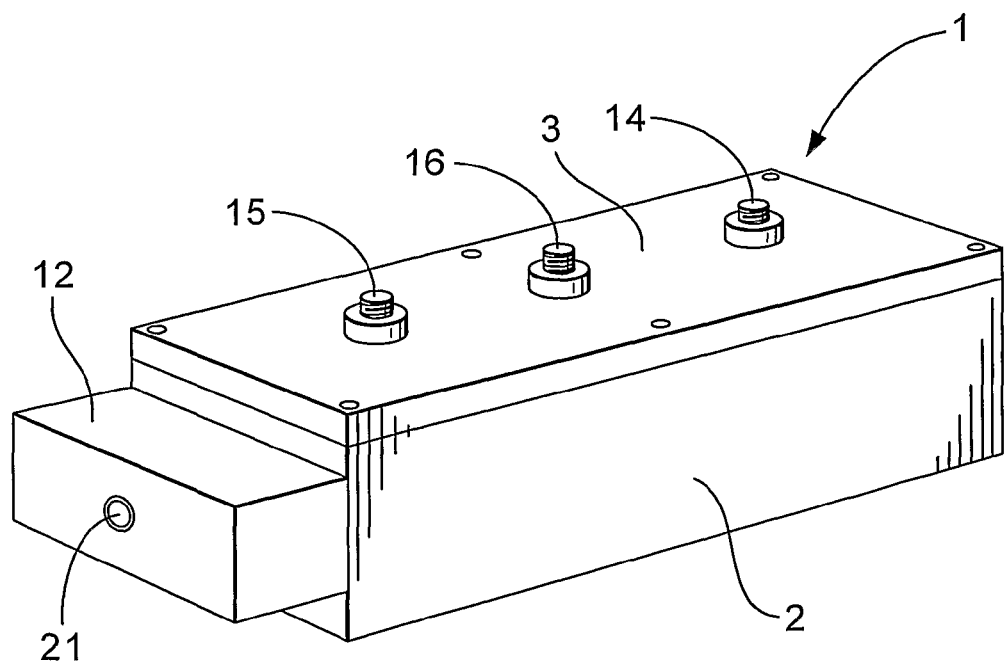
FIG. 1 is a perspective view of a lamp with a bandpass filter in accordance with the invention.

Referring to the drawings, a band pass filter 1 is comprised of a resonant, air filled aluminum chamber 2, having a lid 3, together defining a cuboid resonant cavity 4 having a central iris 5. At opposite end nodes of the cavity, perfect electric conductors (PECs) 6,7 are provided. One is connected to a feed wire 8 from an input 9 at one end of the cavity. The other PEC is connected via a further feed 10 wire to a radiator 11 in an adjacent wave guide 12.

Threaded tuning projections 14, 15 opposite the PECs and 16 in the iris are provided, whereby the pass band and the transmission characteristics of the filter in the pass band can be tuned to match the input impedance of the band pass filter and the wave guide to the output impedance of a microwave drive circuit (not shown). Typically the impedance will be 50Ω.

The wave guide 12 is of ceramic and metallised on its outer surfaces. It is mounted on one end of the filter chamber, with an electrodeless bulb 21 in a central cavity 22 directed axially away from the chamber and the radiator in a further cavity 23 set to one side of the central cavity. This arrangement is a lamp. The arrangement is such that the filter has a pass band including the resonant frequency of the wave guide, conveniently when resonant in the half wave mode. When the filter is driven, the wave guide resonates driving the bulb.

In use, the input impedance, of the combined matching circuit and ceramic wave guide with its bulb, is such that the microwaves at the design frequency are transmitted inwards of the input with negligible reflection. Waves reflected from the ceramic wave guide are reflected back into the wave guide from the output of the matching circuit and are not transmitted through the matching circuit for propagation back towards the drive circuit.

Figure 4:
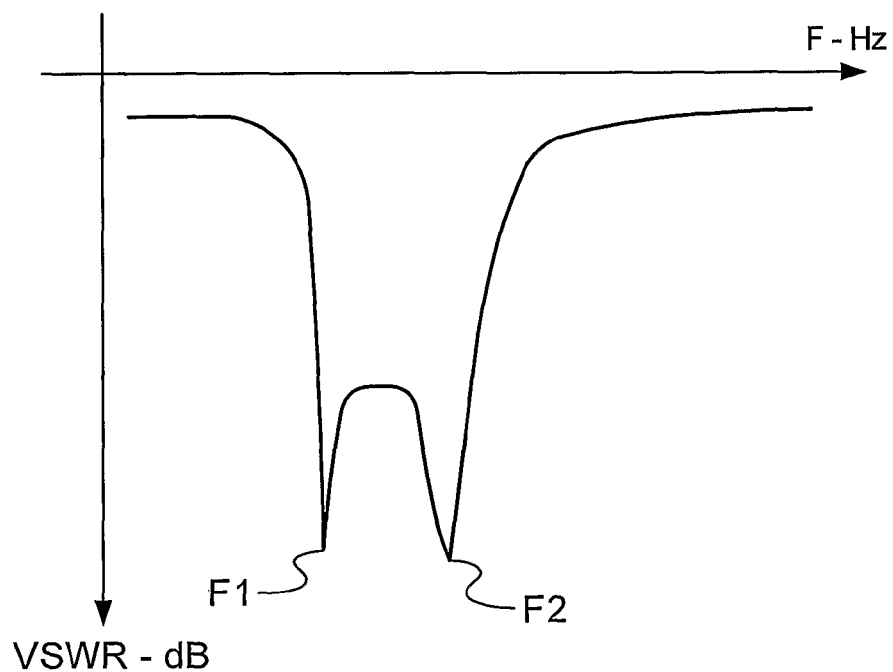
FIG. 4 is a plot of VSWR (Voltage Standing Wave Ratio) response to input frequency with varying frequency of the band pass filter alone.
Figure 2:
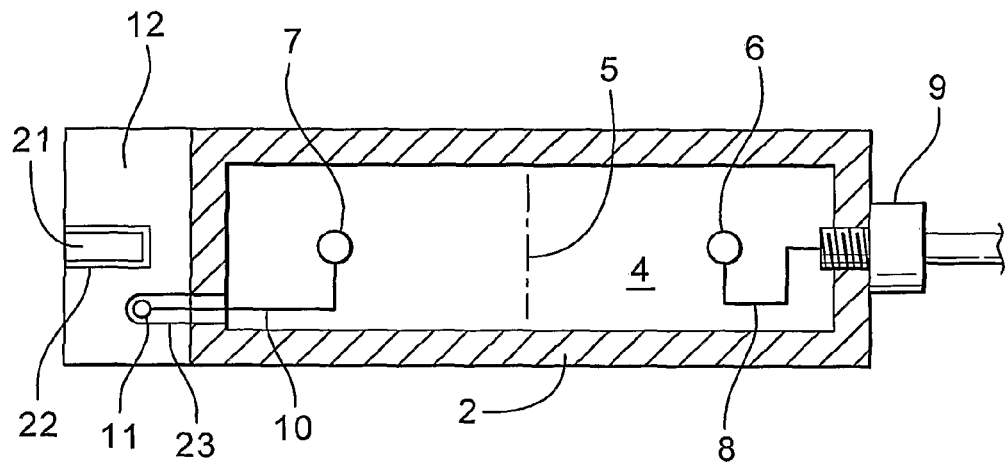
FIG. 2 is a central longitudinal cross-section in plan of the lamp.
Figure 3:
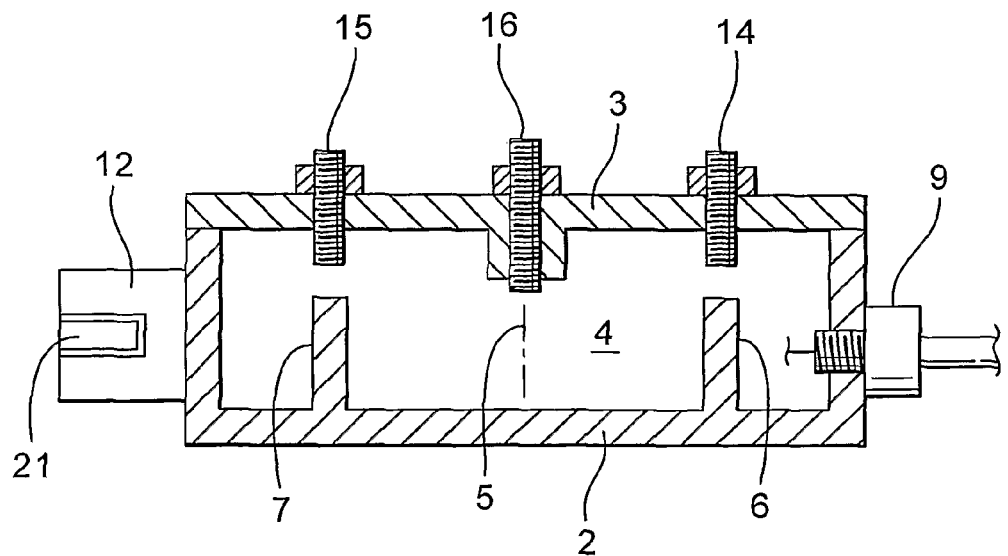
FIG. 3 is a central longitudinal cross-section in elevation of the lamp.

Turning now to FIGS. 4, adjustment of the band pass filter by means of the tuning projections 14,15,16 will now be described. The PECs 6,7 are similar to each other and have their tuning projections 14,15 aligned with their distal ends. Conveniently, the input PEC 6 is tuned to produce the low VSWR frequency spike F1 and the output PEC 7 is tuned to produce the high frequency spike F2. The levels and frequencies of the spikes can be controlled individually, although it will be appreciated that the adjustment of one has an effect on the other. Further, the width of the pass band is primarily controlled by the iris tuning projection 16.

Figure 5:
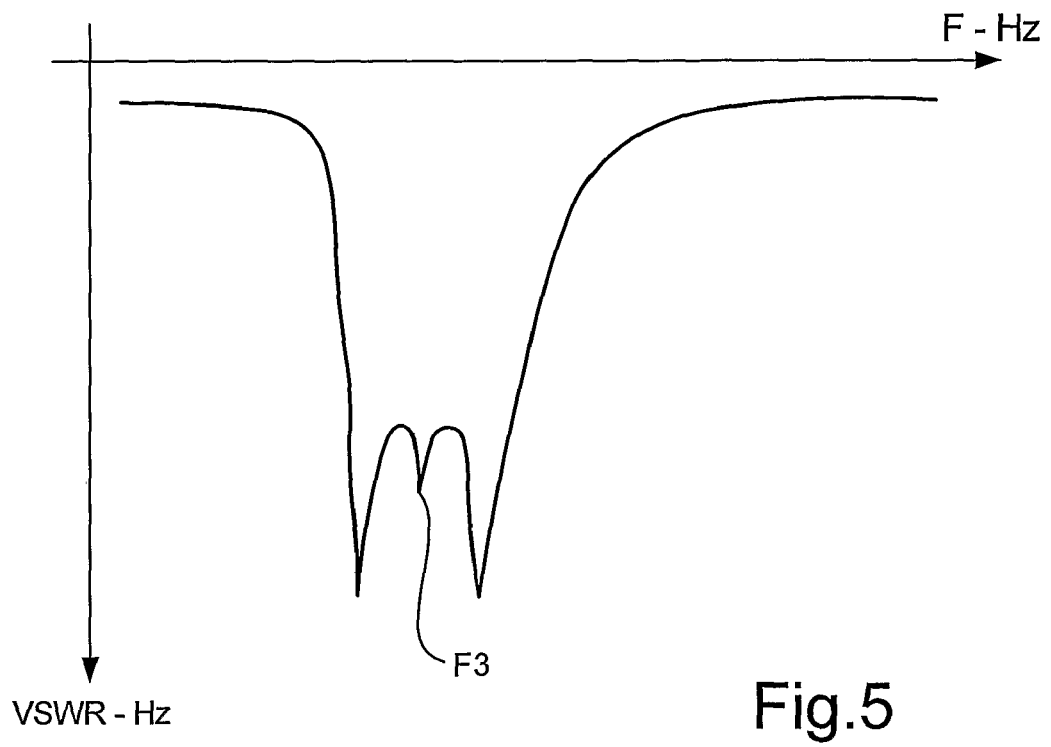
FIG. 5 is a similar plot of the combination of the band pass filter and the wave guide with its lamp prior to lighting of the bulb.
Figure 6:
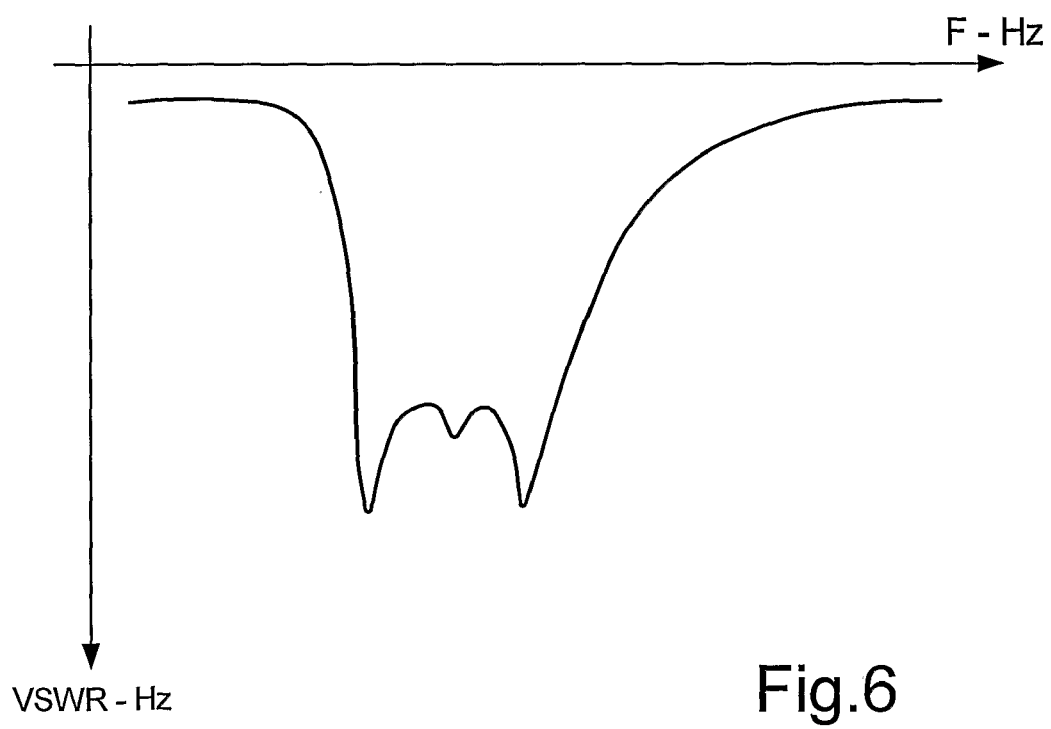
FIG. 6 is another similar plot of the combination after lighting of the bulb.
Figure 7:
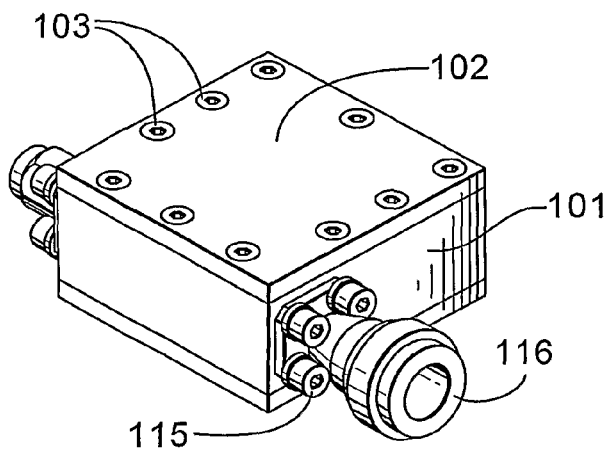
FIG. 7 is perspective view of an exemplary bandpass filter of the invention.
Figure 8:
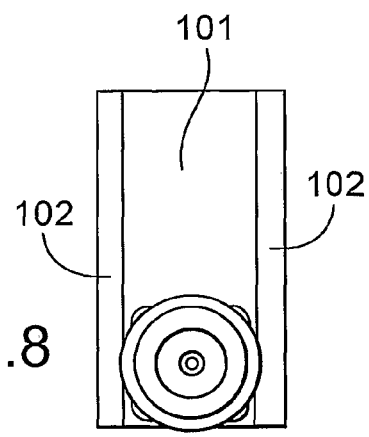
FIG. 8 is a side view of the filter of FIG. 7.
Figure 9:
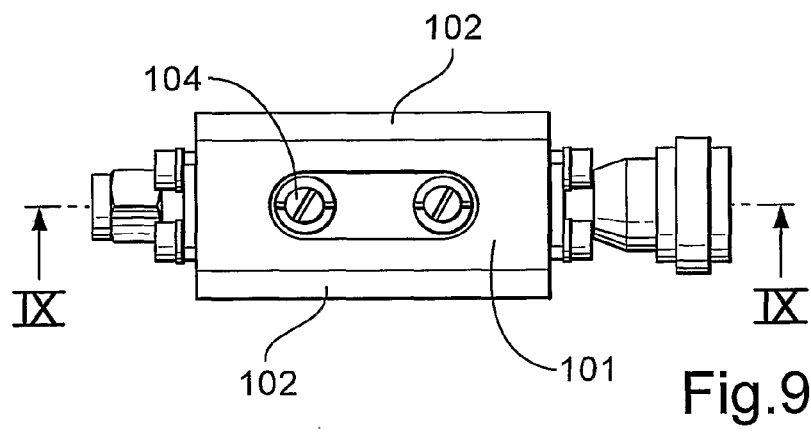
FIG. 9 is a further side view of the filter.
Figure 10:
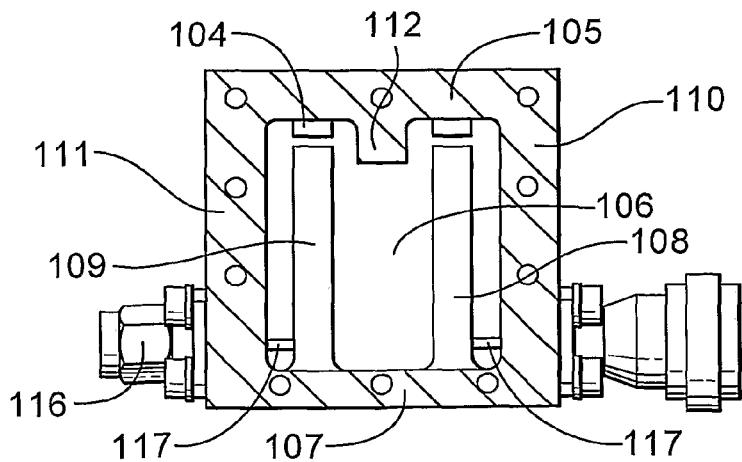
FIG. 10 is a cross-sectional side view on the line IX-IX in FIG. 9.

Whilst FIG. 4 shows the VSWR response of the filter alone, FIG. 5 shows its response when the wave guide and the bulb of the lamp are connected to it. An additional VSWR spike, having a frequency F3 between F1 and F2 is introduced. This is at the resonant frequency of the wave guide. When the lamp has been driven by microwave energy having a frequency within the pass band and with sufficient intensity to cause ionisation of the contents of the bulb, this represents a short circuit to the energy, absorbs it and emits light. The frequency at which the ionisation can be maintained is less specific and the VSWR response, as shown in FIG. 6 widens, particularly at the higher frequency end.

FIGS. 7 to 10 show a practical example of a matching circuit in accordance with the invention and suitable for driving a half wave ceramic wave guide at 2.4 GHz. It comprises a square block 101 of aluminum 39.9×39.9 mm. It has 6.0 mm thick side plates 102 screwed to it by ten screws 103 each. These are uniformly positioned, taking account of tuning screws 104 and connectors described below. The tuning screws are in one side 105 of the block, which has a wall thickness of 5.84 mm. Extending into a central cavity 106 from the opposite side 107, which is 4.24 mm thick, are two PEC fingers 108,109. These are of rectangular section. End walls 110,111 between the side walls 105,107 are 6.60 mm thick, that is in cross-section from the central cavity to the outside. All of the walls have a height—perpendicular to the 6.60 mm thickness—of 16.04 mm.

The PECs 108, 109 are 5.04 mm thick in the direction of the 16.04 mm height and 4.28 mm thick in the direction of the 6.60 mm thickness of the side walls 105, 107. The PEC's are positioned at mid-height of the block in the direction of the height of the side walls. Also they are equally spaced from at 3.15 mm and parallel to the side walls. Thus they have an iris gap between them of 11.84 mm. Extending into the central cavity from the opposite direction, i.e. from the tuning side wall 105 is a full height iris ear 112 centrally placed and 5.70 mm thick. It extends 5.28 mm into the cavity. From the opposite side wall, the PECs extend 26.54 mm. The block, the PECs and the iris ear are all machined from solid. All internal corners are radiused 1.5 mm.

The tuning screws are received in finely tapped bore inserts 113 aligned with the central axes of the PECs. The thread is ¼ inch by 64 threads per inch UNS, which is a very fine thread and allows fine adjustment of the characteristics of the circuit.

The end walls are tapped to receive screws 115 for input and output connectors 116. These have central wires 117 which pass direct to the PECs 3.26 mm from the inside face of the opposite side walls. The PECs are drilled 1.3 mm to receive wires 117. These are soldered in position.

The invention is not intended to be restricted to the details of the above described embodiment. For instance, the skin inside of the aluminum block and the side plates can be plated with very high conductivity metal such as silver or gold. A 2.4 GHz, the skin depth is 2 microns. Plating to 6 or 10 microns provides amply sufficient plating for the currents induced to be in the high conductivity plating.

What is claimed is:

1. A lamp to be driven from a source of microwave energy, the lamp comprising:
   an electrodeless discharge bulb;
   a radiator for radiating microwave energy to the bulb;
   a bulb receptacle formed of ceramic material coated with an electrically conductive shield, the receptacle comprising:
   a first recess containing the bulb, the recess being open to allow light to shine from the bulb, and
   a second recess containing the radiator, with the second recess being open to allow connection of microwaves to the radiator; and
   a microwave circuit comprising:
   an input for microwave energy from the source thereof;
   an output for connect thereof to the radiator in the ceramic receptacle; and a combination of the input, the output, the receptacle and the bulb,
   wherein the microwave circuit comprises:
   a capacitative-inductive circuit configured as a bandpass filter and matching output impedance of the source of microwave energy to input impedance of the capacitative-inductive circuit, receptacle and bulb combination; and further comprises
   a tunable comb line filter; and
   wherein the microwave circuit comprises:
   a metallic housing;
   a pair of perfect electric conductors, each grounded inside the housing;
   a pair of connections to the perfect electric conductors, one for input and the other for output, and
   a respective tuning element provided in the housing opposite the distal end of each perfect electric conductor.

2. The lamp as claimed in claim 1, further comprising an addition tuning element provided in an iris between the perfect electric conductors.

3. The lamp as claimed in claim 1, wherein the metallic housing is plated internally to a skin depth of six microns or more with high electrical conductivity metal.

4. The lamp as claimed in claim 1, wherein the dielectric material between the elements of the microwave circuit is air.

5. The lamp as claimed in claim 1, wherein the dielectric material between the elements of the microwave circuit comprises a ceramic material.

6. The lamp as claimed in claim 1, wherein the bulb receptacle comprises a resonant wave guide.

7. The lamp as claimed in claim 1, wherein the bulb receptacle comprises a resonant half wave guide.

8. The lamp as claimed in claim 6, wherein the resonant wave guide comprises a material having a dielectric constant greater than one.

9. The lamp as claimed in claim 7, wherein the resonant half wave guide comprises a material having a dielectric constant greater than one.

10. The lamp as claimed in claim 6, wherein the resonant wave guide comprises a ceramic material.

11. The lamp as claimed in claim 7, wherein the resonant half wave guide comprises a ceramic material.

* * * * *